United States Patent [19]

Kashiwabara

[11] Patent Number: 5,450,836
[45] Date of Patent: Sep. 19, 1995

[54] APPARATUS AND METHOD FOR CONTROL OF THE AIR-FUEL RATIO OF AN AUTOMOTIVE INTERNAL COMBUSTION ENGINE

[75] Inventor: Masuo Kashiwabara, Atsugi, Japan

[73] Assignee: Unisia Jecs Corporation, Atsugi, Japan

[21] Appl. No.: 200,403

[22] Filed: Feb. 23, 1994

[30] Foreign Application Priority Data

Feb. 23, 1993 [JP] Japan .................. 5-033636

[51] Int. Cl.$^6$ .................................... F02D 41/00
[52] U.S. Cl. ................................................ 123/683
[58] Field of Search ............... 123/683, 681, 679, 672

[56] References Cited

U.S. PATENT DOCUMENTS

| | | | |
|---|---|---|---|
| 4,528,961 | 7/1985 | Katoh et al. | 123/683 |
| 4,552,116 | 11/1985 | Kuroiwa et al. | 123/683 |
| 4,763,629 | 8/1988 | Okazaki et al. | 123/683 |
| 4,936,278 | 6/1990 | Umeda | 123/683 |
| 5,144,915 | 9/1992 | Grabs | 123/683 |
| 5,261,382 | 11/1993 | Nikolai | 123/680 |

FOREIGN PATENT DOCUMENTS

| | | | |
|---|---|---|---|
| 1-187338 | 7/1989 | Japan | 123/683 |
| 2-294532 | 12/1990 | Japan | 123/683 |

*Primary Examiner*—Raymond A. Nelli
*Attorney, Agent, or Firm*—Foley & Lardner

[57] ABSTRACT

With an internal combustion engine wherein a target air-fuel ratio is set on the basis of engine load and engine rotational speed, a setting for a lean air-fuel ratio for improving fuel consumptions prohibited, when an increase in grade resistance is detected or when winding road conditions are estimated, and sets a target air-fuel ratio to ensure drive power is forcibly set. As a result, lean combustion can be avoided under running conditions requiring drive power, so that the vehicle power performance can be ensured as required.

8 Claims, 5 Drawing Sheets

APPARATUS AND METHOD FOR CONTROL OF THE AIR-FUEL RATIO OF AN AUTOMOTIVE INTERNAL COMBUSTION ENGINE

FIELD OF THE INVENTION

The present invention relates to an apparatus and method for control of the air-fuel ratio of an automotive internal combustion engine. In particular the present invention relates to technology for an automotive internal combustion engine wherein a target air-fuel ratio of the engine intake mixture is set in accordance with engine operating conditions, for reliably ensuring the necessary drive power to suit the vehicle operating environment.

DESCRIPTION OF THE RELATED ART

Recently as a means for improving fuel consumption, a lean combustion engine has been proposed wherein combustion is carried out at lean air-fuel ratios of for example 20~25 (referred to hereunder as a lean air-fuel ratio), which are significantly greater than the theoretical air-fuel ratio of 14.7.

With such a lean combustion engine as disclosed for example in Japanese Unexamined Patent Publication No. 1-187338, fuel consumption is improved for example under low rpm/low load operation with combustion at the above-mentioned lean air-fuel ratio, while at the time of high rpm/high load, combustion is carried out at the theoretical or a slightly richer air-fuel ratio dedicated to maintaining torque performance (referred to hereunder as a power air-fuel ratio which includes the theoretical air-fuel ratio). Improvement in fuel consumption together with maintenance of output torque are thus both possible.

With the above mentioned lean combustion engine however, the surplus drive power under lean air-fuel ratio combustion is small compared to that under power air-fuel ratio combustion. Consequently only a slight increase in running resistance (acceleration resistance, grade resistance etc.) can result in insufficient drive power, requiring accelerator operation to further open the throttle, and in the case of an automatic transmission vehicle, calling for an increase in gear change rpm.

As a means for solving the above problem, Japanese Unexamined Patent Publication No. 2-294532 discloses a technique which involves having a mode dedicated to power as a speed change characteristic of the automatic transmission, and a mode dedicated to fuel consumption. The construction is such that these two modes can be optionally selected by driver operation of a switch, with lean combustion being cancelled when the driver selects the power dedicated mode, thus ensuring drive power.

Driver operation of a mode switch every time drive power is required can however be troublesome, and there is also no guarantee that the driver will accurately operate the mode switch. Also, with a manual transmission (M/T) vehicle, an additional switch must be provided to achieve the same function, and even if a switch is already installed, similar problems such as troublesome operation still remain.

SUMMARY OF THE INVENTION

In view of the above mentioned problems, it is an object of the present invention to improve the operability of a vehicle having an engine wherein a target air-fuel ratio is set in accordance with engine operating conditions, by controlling the air-fuel ratio to obtain drive power to meet situations wherein the vehicle running environment calls for an increase in drive power.

Moreover, in the case of a grade, it is an object to be able to reliably obtain the required drive power and thereby improve the operability on a grade.

Furthermore, in the case of a winding road, it is an object to be able to reliably obtain the required drive power and thereby maintain driving performance.

Also, under conditions wherein the vehicle speed is being frequently changed, it is an object to be able to reliably obtain the required drive power and thereby maintain driving performance.

To achieve the above objectives, the apparatus and method according to the present invention for controlling the air-fuel ratio of an automotive internal combustion engine wherein the air-fuel ratio of the engine intake mixture is controlled to conform to a target air-fuel ratio set in accordance with engine operating conditions, is constructed such that the target air-fuel ratio is forcibly set to an air-fuel ratio below a predetermined value, on detection of predetermined vehicle running conditions previously set as conditions requiring drive power.

With such a construction, the target air-fuel ratio is normally allowed to be set in accordance with engine operating conditions. However at the time of the predetermined vehicle running conditions previously set as the conditions requiring drive power, the target air-fuel ratio is forcibly held at a rich air-fuel ratio below a predetermined value, thereby ensuring drive power.

Preferably a situation wherein a vehicle running resistance is above a predetermined value, is detected as the predetermined running condition requiring drive power.

In this case a reduction in the surplus drive power due to the increased running resistance can be avoided.

Preferably the grade resistance may be detected as the vehicle running resistance.

In this case drive power can be ensured on a grade by detecting the grade resistance, thus ensuring maintenance of power performance.

Moreover detection of the grade resistance may involve respectively computing a vehicle drive torque TQSEN, a running resistance RL for zero percent grade, and a vehicle speed change rate $\Delta VSP$, and computing a vehicle grade resistance WSIN based on these values together with a prestored vehicle weight MV, according to the equation:

$$WSIN = TQSEN - RL - MV \times \Delta VSP.$$

With such a construction, the grade resistance due to the grade of the road surface can be detected without the need to directly detect the grade angle of the road surface.

In another aspect, a situation wherein a variance in the vehicle steering angle is above a predetermined value, may be detected as the predetermined running condition requiring drive power.

With such a construction when the vehicle is traveling along a winding road, a target air-fuel ratio to ensure drive power can be maintained, thus keeping power performance for the winding road.

In a further aspect, a situation wherein a variance in the accelerator operated throttle opening is above a predetermined value, may be detected as the predetermined running condition requiring drive power. In this case, the target air-fuel ratio to ensure drive power can be maintained at the time of variable changes in the vehicle speed, thus maintaining acceleration performance.

The construction may be such that the setting of the target air-fuel ratio in accordance with the engine operating conditions, is changed between a predetermined air-fuel ratio equal to or below the theoretical air-fuel ratio, and a predetermined lean air-fuel ratio which exceeds the theoretical air-fuel ratio, with the predetermined air-fuel ratio equal to or below the theoretical air-fuel ratio being forcibly set as the target air-fuel ratio when predetermined running conditions requiring drive power are detected.

With such a construction, when the engine operating conditions are those requiring drive power, the predetermined air-fuel ratio equal to or below the theoretical air-fuel ratio is set, while when the engine operating conditions are those dedicated to fuel consumption performance, the predetermined lean air-fuel ratio which exceeds the theoretical air-fuel ratio is set. However, when the vehicle running conditions are those requiring drive power, then even under conditions for combustion with a lean air-fuel ratio, combustion is carried out at the predetermined air-fuel ratio equal to or below the theoretical air-fuel ratio for obtaining power, so that drive power is ensured.

Further objects and aspects of the present invention will become apparent from the following description of an embodiment given in conjunction with the accompanying drawings.

DETAILED DESCRIPTION OF A PREFERRED EMBODIMENT

FIG. 2 through FIG. 5, show an embodiment of the above-mentioned apparatus and method for control of the air-fuel ratio of an automotive internal combustion engine according to the present invention.

Figure 1:
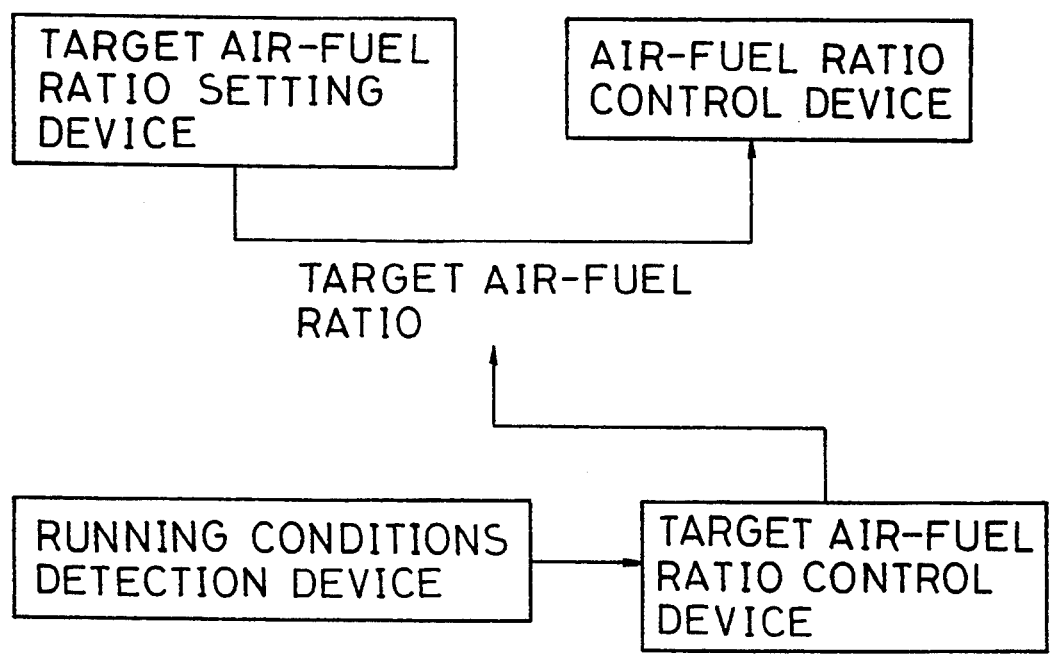
FIG. 1 is a block diagram illustrating a basic structure of the present invention.
Figure 2:
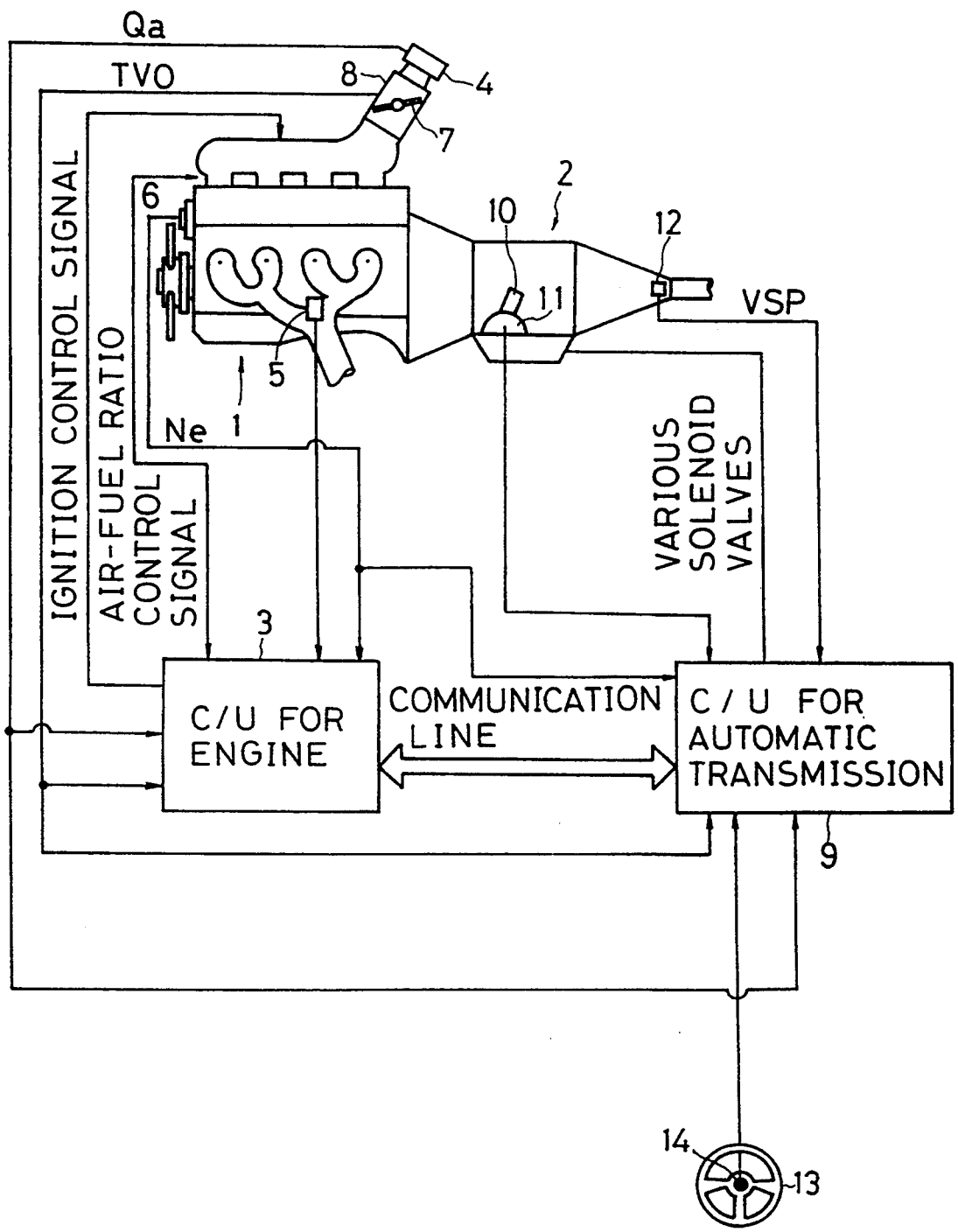
FIG. 2 is a schematic system diagram illustrating a system structure of an embodiment of the present invention.

As shown in FIG. 2 which illustrates a system structure of the embodiment, an internal combustion engine 1 which is mounted on a vehicle (not shown in the figure) is fitted with an automatic transmission 2 (subsequently denoted as A/T). The A/T 2 comprises a fluid type torque converter whereby the output torque of the engine 1 is transmitted to a gear type transmission.

The engine 1 is provided with an electronically controlled fuel injection apparatus. With this apparatus, air-fuel ratio control signals for the fuel injection valves (not shown in the figure) are output by means of a microcomputer based engine control unit 3 (air-fuel ratio control device) so as to produce a target air-fuel ratio mixture.

Detection signals from various types of sensors are input to the engine control unit 3 so as to output the air-fuel ratio control signals. Such sensors comprise for example an air flow meter 4 for detecting the engine 1 intake flow rate Qa, an oxygen sensor 5 for detecting the exhaust oxygen concentration, a crank angle sensor 6 which outputs a detection pulse signal for each predetermined crank angle, and a potentiometer type throttle sensor 8 for detecting a throttle valve opening TVO of a throttle valve 7 which is operated by a linkage to an accelerator pedal (not shown in the figure).

A microcomputer based A/T control unit 9 for controlling the A/T 2 is provided separately from the engine control unit 3.

The A/T control unit 9 is connected for signal communication to the engine control unit 3. However as well as receiving the detection signals from the air flow meter 4, the crank angle sensor 6, and the throttle sensor 8, it also receives detection signals from an inhibitor switch 11 which detects a select range position of an A/T select lever 10, a speed sensor 12 which derives a rotational signal from rotation of the A/T 2 output shaft, and a steering angle sensor 14 provided in a steering wheel 13.

The A/T 2 incorporates various solenoid valves for speed change control, lock-up control, line pressure control and the like. These are controlled by the A/T control unit 9 in accordance with the before-mentioned input signals.

Here the engine control unit 3 has the function of a target air-fuel ratio setting device which switches the target air-fuel ratio for the engine intake mixture in accordance with the engine operating conditions, between a power air-fuel ratio (a rich air-fuel ratio) equal to or below the theoretical air-fuel ratio and a lean air-fuel ratio of for example 20~25, leaner than the power air-fuel ratio.

In this respect, the engine control unit 3 incorporates a map pre-storing target air-fuel ratios with parameters of engine rotational speed Ne computed on the basis of detection signals from the crank angle sensor 6, and engine load equivalent values computed on the basis of said engine rotational speed Ne and the intake flow rate Qa detected by the air flow meter 4. The before-mentioned lean air-fuel ratio and power air-fuel ratio are selectively set as the target air-fuel ratio corresponding to the map. The engine control unit 3 then computes a fuel injection quantity to produce the set target air-fuel ratio mixture on the basis of the cylinder intake flow rate, and outputs a drive pulse signal having a pulse width corresponding to the fuel injection quantity, as an air-fuel ratio control signal for the fuel injection valves.

With combustion at the before-mentioned lean air-fuel ratio, since due to the vehicle running environment it is not possible to maintain a necessary and sufficient drive power, the driver frequently operates the accelerator, and automatic speed change is frequently made accordingly.

In this case the A/T control unit 9 discriminates between the running conditions and the predetermined running conditions pre-set as conditions requiring drive power, and when the predetermined running conditions requiring drive power are met, gives a command for the engine control unit 3 to prohibit the lean air-fuel ratio operation, and allow only operation with the power air-fuel ratio.

Output control of the command signal from the A/T control unit 9 based on detection of the conditions requiring drive power and the detected results, is described in detail below in accordance with the flow chart of FIG. 3 and FIG. 4.

Figure 3:
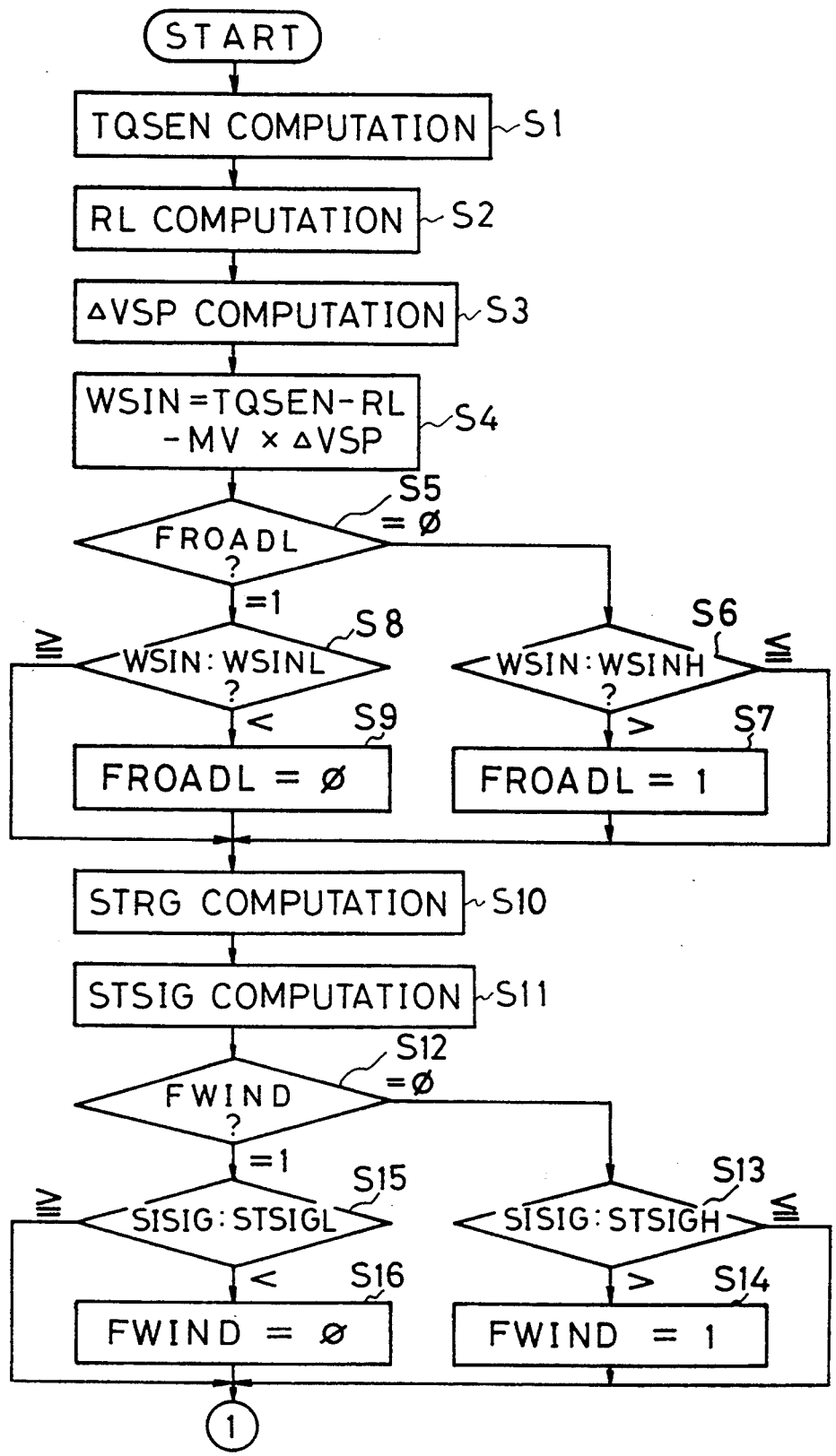
FIG. 3 is a flow chart illustrating a part of an air-fuel ratio control according to the embodiment.
Figure 4:
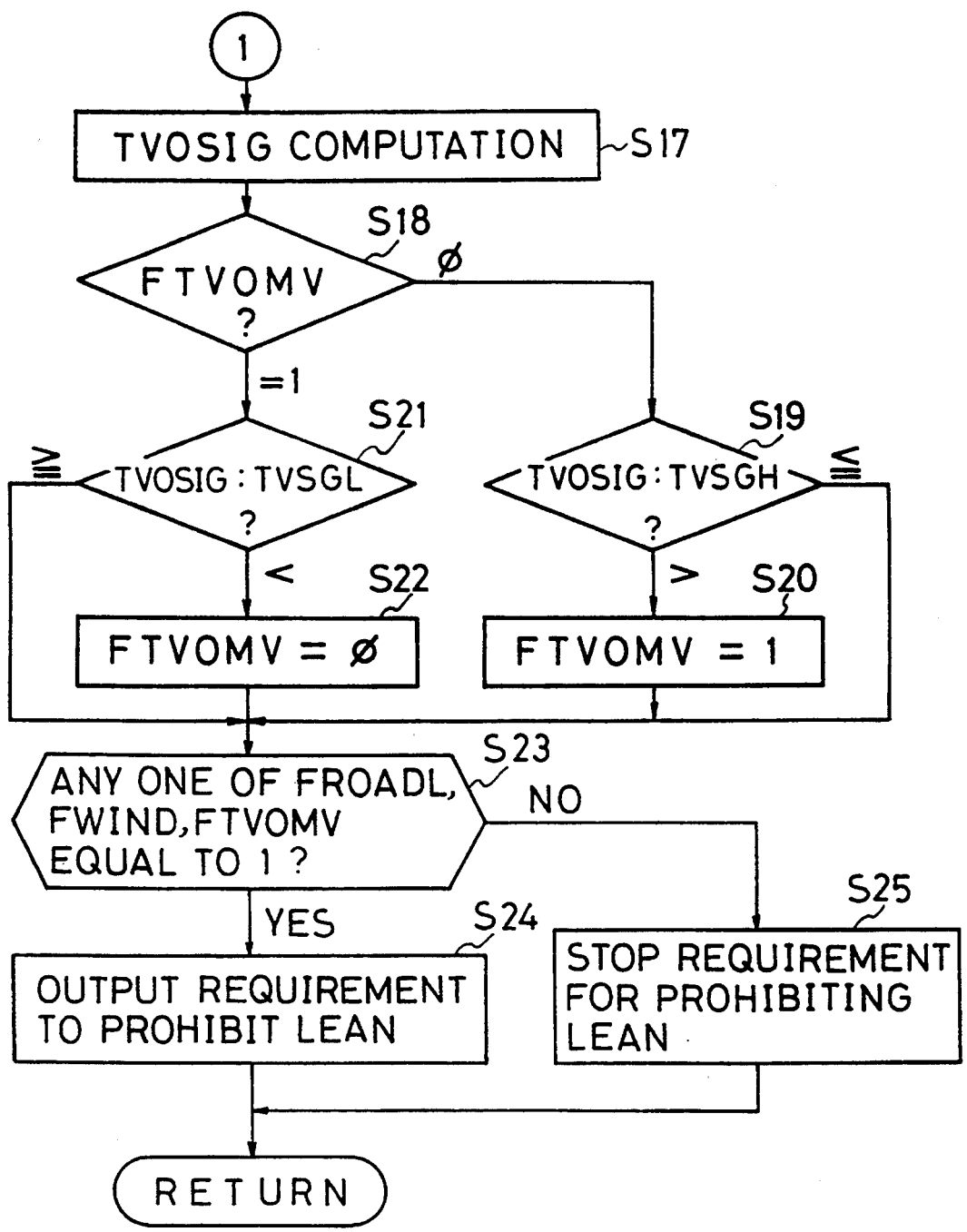
FIG. 4 is a flow chart illustrating another part of the air-fuel ratio control according to the embodiment.

In the present embodiment, the function of the target air-fuel ratio control device is incorporated in the A/T control unit 9 as shown in the flow chart of FIG. 3 and FIG. 4. In addition, the function of the running conditions detection device is realized by the respective sensors, and by the software functions of the A/T control unit 9 shown in the flow chart.

According to the flow chart of FIG. 3 and FIG. 4, initially in step 1, (with "step" denoted by S in the figures) the vehicle drive torque TQSEN is estimated from the following equation:

$$TQSEN = K\,(Qa - Qfric)/Ne \times Tratio \times Gn$$

where; K is a constant, Qa is the engine-intake flow rate detected by the air flow meter 4, Qfric is a flow rate corresponding to a friction loss component, Ne is the engine rotational speed, Tratio is the torque ratio of the torque converter, and Gn is the gear ratio in the gear type transmission.

In the next step 2, the running resistance RL for zero percent grade is computed on the basis of the vehicle speed VSP detected by the speed sensor 12.

In step 3, a change amount $\Delta VSP$ per unit time (vehicle speed change rate) of vehicle speed VSP detected by the speed sensor 12 is computed.

In step 4, an grade resistance WSIN (running resistance) is computed according to the following equation based on the drive torque TQSEN, running resistance RL for zero percent grade, vehicle speed change rate $\Delta VSP$, and a pre-stored vehicle weight MV:

$$WSIN = TQSEN - RL - MV \times \Delta VSP$$

In step 5, a running resistance increase flag FROADL for finding if the running resistance exhibits an increasing trend, is judged.

When the flag FROADL is found to be zero, control proceeds to step 6 where the computed grade resistance WSIN is compared to a grade judgement value WSINH. When the grade resistance WSIN is found to be greater than the grade judgement value WSINH, control proceeds to step 7 where the flag FROADL is set to 1 to indicate that the running resistance is increasing (indicates a grade road).

With progress of control to step 5 when the flag FROADL is set to a value of 1, control proceeds on to step 8 and the grade resistance WSIN is compared to a grade judgement value WSINL (<WSINH). When the grade resistance WSIN is found to be smaller than the grade judgement value WSINL, the road is considered approximately flat and control proceeds to step 9 where the flag FROADL is reset to zero.

In step 10, a steering angle position STRG (number of pulses from a central point position) is computed on the basis of pulse signals output from the steering angle sensor 14 in accordance with operation of the steering wheel 13.

In the next step 11, a standard deviation STSIG of the steering angle position STRG occurring in a predetermined time interval is computed.

In step 12, a flag FWIND for showing if the vehicle travelling path is a winding road is judged.

When the flag FWIND is found to be zero, control proceeds to step 13 and the standard deviation STSIG of the steering angle position STRG is compared to a winding road judgement value STSIGH.

When the standard deviation STSIG is greater than the winding road judgement value STSIGH, that is to say the road is winding and the variance in the steering angle is large, control proceeds to step 14 where the flag FWIND is set to 1 to indicate a winding road.

On the other hand when in step 12 the flag FWIND is found to be 1, control proceeds to step 15 where the standard deviation STSIG is compared to the winding road judgement value STSIGL (<STSIGH).

When the standard deviation STSIG is found to be smaller than the winding road judgement value STSIGL, that is to say when the road is relatively straight, and the steering wheel has been turned only slightly (steering angle variance is small), control proceeds to step 16 where the flag FWIND is reset to zero.

In the next step 17, a standard deviation TVOSIG of the throttle valve opening TVO occurring in a predetermined time interval is computed.

Then in the next step 18, a flag FTVOMV for showing if the variation in throttle valve opening TVO is large, is judged. When the flag FTVOMV is found to be zero, control proceeds to step 19 where the standard deviation TVOSIG is compared to an opening variation judgement value TVSGH.

When the standard deviation TVOSIG is greater than the opening variation judgement value TVSGH, with the throttle valve opening TVO changing over a wide range in the predetermined time interval (large variance in throttle valve opening TVO), control proceeds to step 20 where the flag FTVOMV is set to 1.

On the other hand, when in step 18 the flag FTVOMV is found to be 1, control proceeds to step 21 where the standard deviation TVOSIG is compared to the opening variation judgement value TVSGL (<TVSGH).

When the standard deviation TVOSIG is found to be smaller than the opening variation judgement value TVSGL, with the throttle valve opening TVO approximately stable (small variance in throttle valve opening TVO), control proceeds to step 22 where the flag FTVOMV is reset to zero.

In the next step 23, it is judged if at least one of the flags FROADL, FWIND or FTVOMV is 1, that is to say if the situation corresponds to at least one of the cases of a grade road, a winding road, or a frequently changed throttle valve opening.

When at least one of the flags FROADL, FWIND, FTVOMV has a value of 1, control proceeds to step 24 and a command is output to the engine control unit 3 to prohibit the lean air-fuel ratio operation. On receipt of the command, the engine control unit 3 increases the output torque by causing combustion with the power air-fuel ratio, even when the engine operating conditions are those for combustion with the lean air-fuel ratio.

Accordingly, when the vehicle is travelling up a grade or along a winding road, or under conditions requiring frequent accelerator operation (including winding road travelling conditions), the engine output can be increased to maintain a surplus drive power, thereby avoiding an increase in accelerator operation and frequent speed change control.

Figure 5:
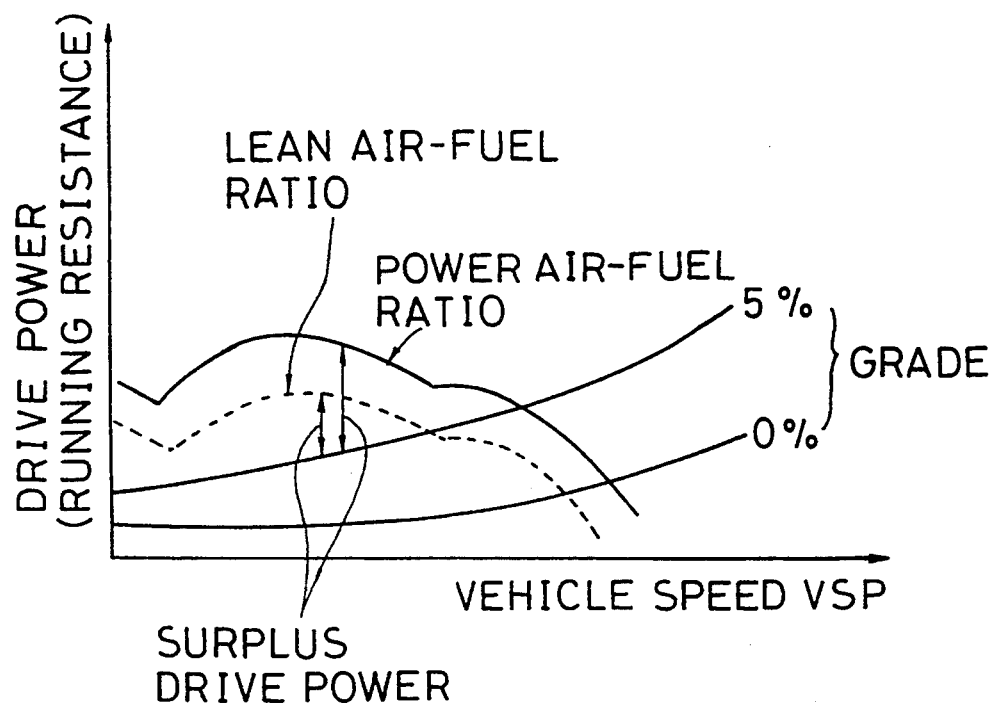
FIG. 5 is a graph showing a change in surplus drive power with change in target air-fuel ratio.

For example, when the vehicle is travelling on a grade road, the increase in grade resistance (running resistance) due to the grade is detected. The setting of a lean air-fuel ratio as the target air-fuel ratio is thus prohibited, with the air-fuel ratio being controlled to give the power air-fuel ratio as the target air-fuel ratio. Hence a change to a lean air fuel ratio at the time of a grade, with the consequence of insufficient surplus drive power can be prevented as shown in FIG. 5.

Moreover, in the case of a winding road, a power air-fuel ratio unrelated to the engine driving conditions is set as the target air-fuel ratio, thereby ensuring power performance on the winding road.

Furthermore, at the time of frequent speed changes, acceleration performance can be ensured by keeping the target air-fuel ratio at the power air-fuel ratio.

When on the other hand, it is found in step 23 that none of the flags are set to 1, control proceeds to step 25, where output of the signal required to prohibit the lean air fuel ratio becoming the target air-fuel ratio is stopped. The engine is thus operated with the lean air-fuel ratio for the previously set lean combustion range in accordance with the normal engine operating conditions.

In the above embodiment, the presence of a grade road is detected on the basis of a change in the surplus drive power with respect to the running resistance occurring for a zero percent grade. However, a construction is possible wherein the grade resistance is obtained by using a vehicle grade sensor to detect a grade road.

Furthermore, instead of the steering angle sensor, a sensor may be provided for detecting the acceleration in the transverse direction of the vehicle (side G force), and the variance in the steering angle thus detected indirectly by the side G force sensor.

The present embodiment has been described with respect to an engine fitted with an automatic transmission 2. The embodiment is however also applicable to an engine incorporating a manual transmission.

What is claimed is:

1. An apparatus for controlling the air-fuel ratio of an automotive internal combustion engine, said apparatus comprising:

target air-fuel ratio setting means for changing the setting of a target air-fuel ratio of an engine intake mixture between a predetermined air-fuel ratio equal to or below a theoretical air-fuel ratio and a predetermined lean air-fuel ratio above the theoretical air-fuel ratio in accordance with engine operating conditions;

grade resistance detection means for detecting a vehicle grade resistance;

lean combustion prohibiting means for prohibiting said predetermined lean air-fuel ratio from being set as the target air-fuel ratio and forcibly setting said predetermined air-fuel ratio equal to or below the theoretical air-fuel ratio as the target air-fuel ratio when the grade resistance detected by said grade resistance detection means is equal to or above a predetermined value; and air-fuel ratio control means for controlling the air-fuel ratio of the engine intake mixture to conform to said target air-fuel ratio.

2. An apparatus for controlling the air-fuel ratio of an automotive internal combustion engine as claimed in claim 1, wherein said grade resistance detection means comprises means for computing each of a vehicle drive torque TQSEN, a running resistance RL for zero percent grade, and a vehicle speed change rate $\Delta$VSP, and means for computing a vehicle grade resistance WSIN based on the respectively computed vehicle drive torque TQSEN, running resistance RL for zero percent grade and vehicle speed change rate $\Delta$VSP, and a vehicle weight MV, according to the equation:

$$WSIN = TQSEN - RL - MV \times \Delta VSP.$$

3. An apparatus for controlling the air-fuel ratio of an automotive internal combustion engine, said apparatus comprising:

target air-fuel ratio setting means for changing the setting of a target air-fuel ratio of an engine intake mixture between a predetermined air-fuel ratio equal to or below a theoretical air-fuel ratio and a predetermined lean air-fuel ratio above the theoretical air-fuel ratio in accordance with engine operating conditions;

vehicle steering angle variance detection means for detecting a variance in the vehicle steering angle;

lean combustion prohibiting means for prohibiting said predetermined lean air-fuel ratio from being set as the target air-fuel ratio and forcibly setting said predetermined air-fuel ratio equal to or below the theoretical air-fuel ratio as the target air-fuel ratio when the variance in the vehicle steering angle detected by said vehicle steering angle variance detection means is equal to or above a predetermined value; and air-fuel ratio control means for controlling the air-fuel ratio of the engine intake mixture to conform to said target air-fuel ratio.

4. An apparatus for controlling the air-fuel ratio of an automotive internal combustion engine, said apparatus comprising:

target air-fuel ratio setting means for changing the setting of a target air-fuel ratio of an engine intake mixture between a predetermined air-fuel ratio equal to or below a theoretical air-fuel ratio and a predetermined lean air-fuel ratio above the theoretical air-fuel ratio in accordance with engine operating conditions;

accelerator operated throttle opening variance detection means for detecting a variance in the accelerator operated throttle opening;

lean combustion prohibiting means for prohibiting said predetermined lean air-fuel ratio from being set as the target air-fuel ratio and forcibly setting said predetermined air-fuel ratio equal to or below the theoretical air-fuel ratio as the target air-fuel ratio when the variance in the accelerator operated throttle opening detected by said accelerator operated throttle opening variance detection means is equal to or above a predetermined value; and air-fuel ratio control means for controlling the air-fuel ratio of the engine intake mixture to conform to said target air-fuel ratio.

5. A method for controlling the air-fuel ratio of an automotive internal combustion engine, comprising:

detecting a vehicle grade resistance;

changing the setting of a target air-fuel ratio of an engine intake mixture between a predetermined air-fuel ratio equal to or below a theoretical air-fuel ratio and a predetermined lean air-fuel ratio above the theoretical air-fuel ratio in accordance with engine operation conditions when said vehicle grade resistance is below a predetermined value;

fixing said target air-fuel ratio at said predetermined air-fuel ratio equal to or below the theoretical air-fuel ratio when said vehicle grade resistance is equal to or above said predetermined value; and supplying fuel to the engine based on a fuel injection amount computed in accordance with said target air-fuel ratio.

6. A method for controlling the air-fuel ratio of an automotive internal combustion engine as claimed in claim 5, wherein a vehicle grade resistance WSIN is computed based on a vehicle drive torque TQSEN, a running resistance RL for zero percent grade, a vehicle speed change rate $\Delta$VSP and a vehicle weight MV, according to the equation:

$$WSIN = TQSEN - RL - MV \times \Delta VSP.$$

7. A method for controlling the air-fuel ratio of an automotive internal combustion engine, comprising:
   detecting a variance in a vehicle steering angle;
   changing the setting of a target air-fuel ratio of an engine intake mixture between a predetermined air-fuel ratio equal to or below a theoretical air-fuel and a predetermined lean air-fuel ratio above the theoretical air-fuel ratio in accordance with engine operation conditions when said variance in the vehicle steering angle is below a predetermined value;
   fixing said target air-fuel ratio at said predetermined air-fuel ratio equal to or below the theoretical air-fuel ratio when said variance in the vehicle steering angle is equal to or above said predetermined value; and
   supplying fuel to the engine based on a fuel injection amount computed in accordance with said target air-fuel ratio.

8. A method for controlling the air-fuel ratio of an automotive internal combustion engine, comprising:
   detecting a variance in an accelerator-operated throttle opening;
   changing the setting of a target air-fuel ratio of an engine intake mixture between a predetermined air-fuel ratio equal to or below a theoretical air-fuel ratio and a predetermined lean air-fuel ratio above the theoretical air-fuel ratio in accordance with engine operation conditions when said variance in the accelerator-operated throttle opening is below a predetermined value;
   fixing said target air-fuel ratio at said predetermined air-fuel ratio equal to or below the theoretical air-fuel ratio when said variance in the accelerator-operated throttle opening is equal to or above said predetermined value; and
   supplying fuel to the engine based on a fuel injection amount computed in accordance with said target air-fuel ratio.

* * * * *